Dec. 24, 1935.  E. D. LILJA  2,025,062
CONTROL FOR CONTOUR REPRODUCTION
Original Filed Feb. 26, 1931
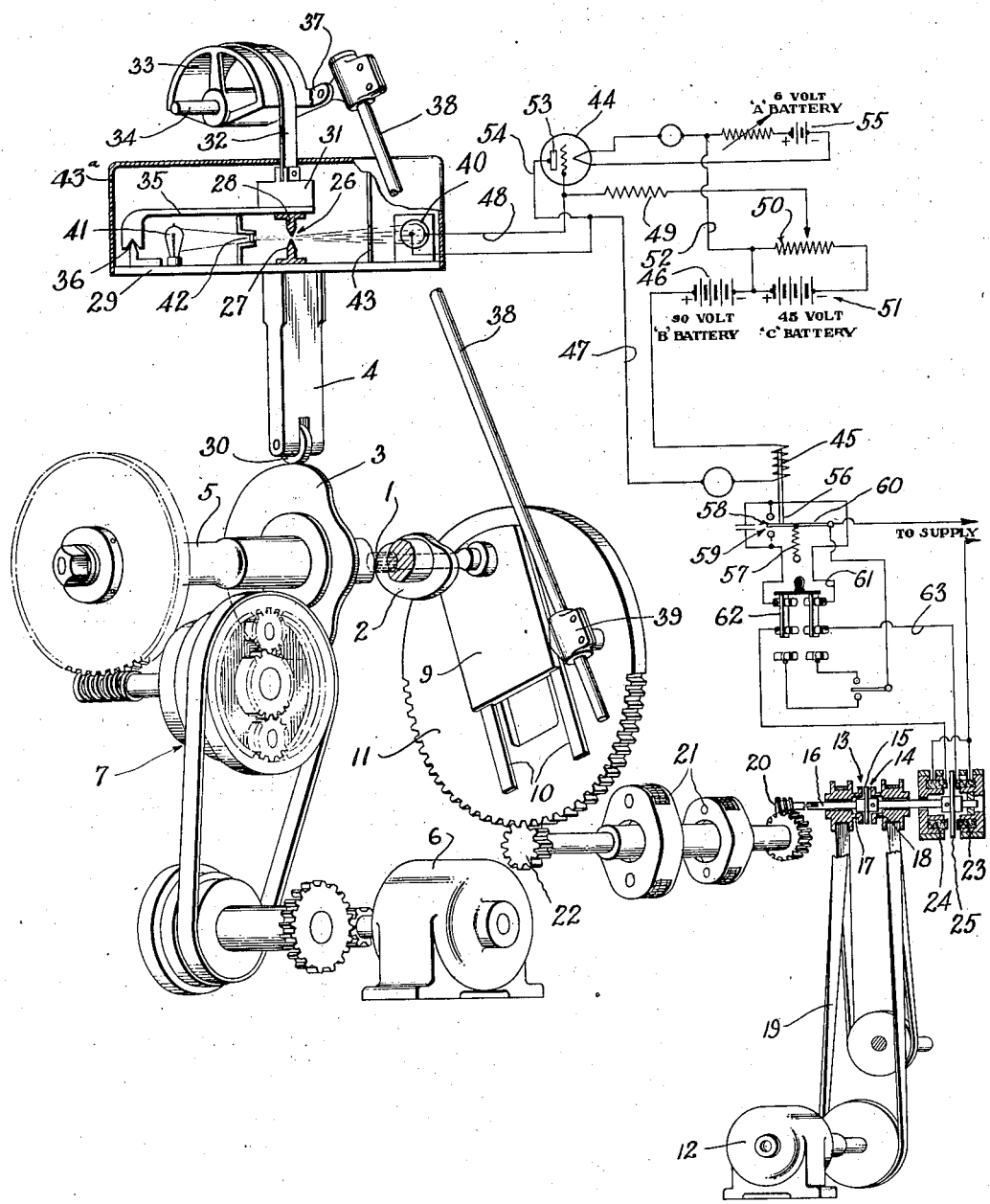
INVENTOR
Edgar D. Lilja
BY
ATTORNEYS Patented Dec. 24, 1935

2,025,062

UNITED STATES PATENT OFFICE 2,025,062

CONTROL FOR CONTOUR REPRODUCTION

Edgar D. Lilja, Rockford, Ill., assignor to Howard D. Colman, Rockford, Ill.

Application February 26, 1931, Serial No. 518,346
Renewed July 10, 1933

17 Claims. (Cl. 90—13)

This invention relates to a system of control for the reproduction of contours and has more particular reference to the automatic control of the tool feed in cam-cutting, die-sinking or other machines for shaping the surface of a work-blank to conform to a pattern.

The object of the invention is to provide a novel means and method by which variations in the positions of a controlled object such as a cutting tool and a pattern-controlled object may be detected with a high degree of accuracy and utilized readily to control a power-actuated feeding mechanism for driving the controlled object so as to maintain positional agreement between the two objects.

In carrying out this object, the invention contemplates first the provision of an opening whose area is varied automatically with changes in the positional relation of the two objects, secondly the measurement of the area of said opening with the aid of a light sensitive device such as a photoelectric cell, and third, the control of a power-actuated feeding mechanism according to variations in the electrical characteristics of said device.

In the form illustrated in the accompanying schematic drawing and wiring diagram, the invention is incorporated in a cam-cutting machine of the type disclosed in a copending application of Duncan J. Stewart, Serial No. 476,557, filed August 20, 1930. Generally stated, the machine embodies a tool such as a rotary cutter 1 adapted to be fed relative to a work-blank 2 along a fixed path according to variations in the surface contour of a master cam or pattern 3 detected by a controlling object such as a feeler or tracer 4.

Herein the work-blank and master cam are mounted on a shaft 5 whose rotation causes successive peripheral portions of the blank 2 and corresponding portions of the master cam to be presented to the cutter and tracer 4 respectively. The shaft is driven at slow speed by an electric motor 6 operating through the medium of suitable speed-reducing mechanism 7.

Preferably the tool 1 is a milling cutter with its shank rotated constantly during a cam-cutting operation from an independent source of power (not shown) and journaled in a slide 9 which is supported by and guided along ways 10 extending diametrically of a drum or cradle 11 mounted to oscillate about a fixed horizontal axis extending parallel to that of the work. When the axis of the cutter is disposed eccentrically of the cradle axis as shown in the drawing, it will be apparent that angular movement of the cradle in a clockwise direction will carry the cutter axis toward the work axis along an arcuate path the curvature of which is determined by the spacing of the cutter and cradle axes. Such feed of the cutter causes a deeper cut to be made in the work-blank. Similarly, counter-clockwise movement of the cradle decreases the depth of cut.

Power for feeding the cutter in opposite directions toward and away from the work axis is derived from a third individual electric motor 12 and is applied to the supporting cradle 11 through the medium of an electromagnetically controlled reversing mechanism and a system of gearing capable of effecting an extremely large reduction in the speed of the output shaft of the motor drive. The direction of the cutter feed is determined by the reversing mechanism which operates to feed the cutter constantly in one direction or the other.

The reversing mechanism herein employed includes two electromagnetically controlled friction clutches 13 and 14 having a common driven element in the form of a disk 15 fast on a shaft 16 and two driving elements in the form of sleeves 17 and 18 having opposed end flanges adapted for selective gripping engagement with the disk 15. The driving sleeves are rotated constantly in opposite directions and at high speed from the motor 12 through the medium of a belt 19. Proper reduction in the speed of the shaft 16 and transmission of the motive power to the cradle 11 is effected through the medium of worm gearing 20, planetary gearing 21 and a pinion 22 which meshes with gear teeth formed around the periphery of the cradle.

Selective engagement of the clutches to determine the direction of the cutter feed is controlled by two magnets 23 and 24 arranged to act on an armature in the form of an axially shiftable disk 25 fast on the shaft 16 and held against axial movement relative thereto. Upon energization of either magnet, the armature will force the shaft axially thereby shifting the disk 15 into engagement with one of the driving surfaces.

The method of controlling the direction of the cutter feed contemplated by the present invention consists in regulating the operation of the reversing mechanism above described in accordance with changes in the total amount of light passing through an opening of relatively small area which area is varied progressively according to changes in the relative positions of the cutter and work-blank and also according to changes in the relative positions of the master cam and tracer 4. In the present instance, the opening, which preferably is in the form of an elongated slit 26 of very narrow width, is defined by two horizontal knife blades 27 and 28 having opposing edges arranged in closely spaced parallel relation.

The lower blade 27 projects upwardly from and is rigid with a platform 29 mounted on the upper end of the tracer 4 which is in the form of a rod accurately guided for vertical movement along a path which intersects the axis of the master cam 3. At its lower end, the rod carries a roller 30 which rides on the pattern surface to be reproduced. With this arrangement, it will be observed that the tracer and the platform 29 will move bodily up and down in its vertical guideway as the roller 30 encounters rising and falling portions of the pattern surface during rotation of the pattern. If the upper blade 28 were maintained stationary, such up and down movements would, it will be observed, decrease and increase the width and therefore the area of the opening 26.

The upper blade 28 is rigid with a block 31 attached to the downwardly hanging end of a flexible metal tape 32 whose upper end follows around the circumference of a segmental drum 33 pivotally supported by a horizontal shaft 34 which extends parallel to the axis of the cradle 11. Rigid with the block 31 is a relatively long lateral arm 35 which has a knife edge connection 36 with the platform 29 which connection maintains the knife edges 27 and 28 in truly parallel relation and at the same time allows for the small degree approaching and receding movement between these edges which is required in the present method of control.

The tape is secured by a micrometer adjustment means (not shown) to the drum 33 which constitutes a crank arm pivotally connected at 37 to one end of a link 38, the other end of which has an adjustable pivotal connection 39 with the cradle 11. Through the parallel motion device thus formed, the oscillatory motion of the cutter is converted into reciprocatory motion of the knife edge 28 which is thus lowered and raised as the cutter is fed toward and away from the axis of the work-blank. Such movements of the knife edge cause the width of the slit 26 to be decreased and increased respectively.

Inasmuch as the width of the opening 26 is determined by the position of the cutter 1 and also of the tracer 4, the cutter may be made to follow the movements of the tracer by regulating the direction of the cutter feed so as to maintain the area of the opening 26 substantially uniform. Means is therefore provided for detecting extremely minute changes in the width of the slit relative to a predetermined value, which in the present instance is approximately .001 inch. The means herein employed is responsive to the amount of light passing through the slit from a source of constant intensity. Preferably, the light sensitive means is in the form of a photoelectric cell 40 of well known construction mounted within a chamber the defining walls of which are supported by the platform 29 and substantially closed except for the slit which is in one of the walls. An incandescent electric bulb 41 mounted externally of the photo-electric cell chamber and itself preferably enclosed and separated from extraneous light may constitute the source of light the rays from which are condensed by a lens 42 to form a beam directed toward the slit 26. Between the slit 26 and the cell 40 is placed an opaque plate 43 having an aperture therein and acting to screen from the cell any light entering the enclosing chamber but not under the control of the knife-edges. In the present instance, the chambers in which the cell 40 and the light source 41 are enclosed are defined by a casing 43a, the plate 43 constituting a partition dividing the casing into the two chambers.

It will be observed that some electrical characteristic of the photo-electric cell such as resistance, output current, etc. will vary according to the amount of light to which the cell is exposed. This amount, it will be observed, is determined by area of the opening 26 which depends upon the spacing of the knife edges 27 and 28. Inasmuch as these define an extremely narrow but elongated opening in the present machine, the change in light amount for a given change in the spacing of the edges is relatively large thereby enabling extremely minute changes in the positions of the cutter and tracer to be detected readily. The use of an opening of this type also simplifies the construction and mounting of the parts for varying the area of the opening, enables the area of the opening to be measured conveniently for purposes of adjustment, and the parts to be inspected readily and maintained in good working order.

Preferably, the cell 40 is of the type whose electrical resistance varies with the amount of light to which the cell is exposed. These changes in the resistance of the cell 40 are detected with the aid of an amplifying system including a thermionic tube 44 and utilized thereby to control the energization of the winding 45 of an electromagnetic relay by which the two magnetic clutches 13 and 14 are controlled. Current is supplied to the photo-electric cell by a battery 46 through a circuit which extends from the battery through the relay coil 45, a conductor 47, the cell 40, a conductor 48, a coupling resistance 49, a part of the resistance 50 of a potentiometer 51 to the other battery terminal. The current in this circuit increases as the amount of light passing through the slit 26 increases and decreases with a decrease in the amount of light.

It will thus be seen that the voltage across the coupling resistance, which is a measure of the cell resistance, increases and decreases in proportion to changes in the width of the slit 26. This voltage drop is impressed upon the input circuit of the tube 44 by connecting the grid thereof to the conductor 48 and by interposing a conductor 52 between the tube filament and the positive end of the potentiometer 51. The output circuit of the tube extends from the plate 53 through a conductor 54, a conductor 47, relay coil 45, battery 46, conductor 52 to the tube filament which is heated by a battery 55. Thus during a cam-cutting operation, the relay coil 45 is constantly energized and exerts a force on its armature 56 which opposes the action of a spring 57 and increases and decreases automatically as the width of the control slit 26 is increased and decreased.

The potentiometer 51 is normally set to produce optimum sensitivity in the amplifying system, that is to say, maximum percentage change of the current in the output circuit for a given change in the spacing of the knife edges 27 and 28. The force exerted by the spring 57 is adjusted so as to be substantially balanced by the attractive force which the relay exerts when the edges 27 and 28 are spaced a predetermined distance apart, for example .001 inch. Thus, when the slit 26 is wider than .001, the force exerted upon the armature 56 will overcome the spring 57 and maintain a switch 58 closed. When the knife edges are spaced closer than .001 inch, the spring will move the armature against the attractive force of the relay and maintain a switch 59 closed.

The control system above described has been found to be extremely sensitive, responding to a change in knife edge separation of .00006 inch when a 50 candle power source of light is used.

The control switch 58 which, as above described, is closed when the edges 27 and 28 become separated more than the predetermined distance, controls the engagement of the magnetic clutch 14 which causes the cutter 1 to be fed into the work-blank 2 and make a deeper cut. This control is effected by a circuit which extends from a current source (not shown) to the common terminal 60 of the two switches and thence through a conductor 61, a normally closed manually operable switch 62, a conductor 63, the winding 23 to the other terminal of the current source. The winding 24 for causing engagement of the clutch 13 is energized by a similar circuit upon closure of the switch 59 which occurs as above described when the width of the slit 26 is reduced below .001 inch.

From the foregoing it will be apparent that during the one revolution of the master cam and work-blank required to make one cut around the entire work-blank surface, the direction of the cutter feed toward and away from the work axis will be reversed frequently even when the tracer roller 30 is engaging a dwell surface. These intermittent reversals also take place while a rising or falling master cam surface is being encountered although the duration of the feed in one direction is longer than that in the other depending on the slope of the surface. By thus controlling the direction of cutter feed so as to maintain the knife edges spaced .001 of an inch apart within a variation of .00006 of an inch, the cutter follows accurately the movements of the master cam tracer with the result that the pattern surface is reproduced on the work-blank with a high degree of accuracy. By utilizing the variations in the amount of light passing between two controlling objects such as the knife edges 27 and 28, the present method of control is extremely sensitive and advantageous especially because it is not appreciably affected by fine dust particles which may accumulate upon the opposing surfaces of the controlling knife edges even when the latter are encased. The mechanism and electrical circuits employed in carrying out the present method are exceedingly simple to construct and maintain in proper operative condition.

I claim as my invention:

1. In a machine for reproducing a pattern contour on a work-blank, the combination of means providing a darkened enclosure, means outside of said enclosure providing a source of light of substantially constant intensity, a pair of control elements arranged for relative edgewise movement and having their edges arranged in closely spaced relation so as to define a narrow slit in one wall of said enclosure for the passage of light therethrough from said source, a tracer arranged to vary the spacing of said elements in accordance with changes in the contour of a pattern, a cutter operable upon said work-blank and connected to one of said elements so as to vary the spacing of the elements in accordance with changes in the relative positions of the cutter and work-blank, reversible power-actuated means to feed the cutter gradually and continuously into or out of said work-blank and thereby to decrease and increase the width of said slit respectively, electromagnetic means controlling the direction of operation of said power-actuated means, a photo-electric cell within said enclosure, and means including a thermionic device responsive to the gradual variations in the resistance of said cell and arranged to control said electromagnetic means and thereby vary the operation of said power-actuated means so as to maintain said resistance at a substantially constant value.

2. In a machine for reproducing a pattern contour on a work-blank, the combination of a member mounted to trace the surface of said pattern and to move back and forth with variations in the surface contour, means supported by and movable with said member providing a darkened enclosure having an opening in one of its walls the area of which varies automatically with the movement of said member, a cutter for operating upon said work-blank to reproduce the pattern contour, means actuated by the feeding movement of said cutter to vary the area of said opening, power actuated means for feeding said cutter into and out of the work-blank and thereby change the area of said opening, means external of said enclosure for projecting a beam of light on said opening, a photo-electric cell within said enclosure, and electromagnetic means controlled by said cell for regulating the operation of said power feeding means so as to maintain the area of said opening substantially constant and therefore the cutter in positional agreement with said tracing member.

3. In a machine for reproducing a pattern contour on a work-blank, the combination of a tracing element arranged to follow the pattern surface and to be moved along a fixed pattern in accordance with variations in said surface, a cutting element mounted for feeding movement relative to said work-blank, a pair of elongated members mounted for relative edgewise movement and having parallel edges arranged in closely spaced parallel relation so as to define a narrow slit for the passage of light therethrough, means for varying the spacing of said members in accordance with the combined movements of said elements so that the width of said slit is increased as said tracing element encounters a falling surface and as said cutting element is fed out of said work-blank, the width of said slit decreasing with reverse movements of said elements, reversible power-actuated means for feeding said cutting element in opposite directions, electromagnetic means governing the direction of operation of said feeding means, a photo-electric cell exposed to the light passing through said slit, and means responsive to changes in the resistance of said cell to control said electromagnetic means and cause said cutting element to be fed in a direction to maintain the width of said slit substantially uniform.

4. In a machine for reproducing a pattern contour on a work-blank, the combination of a tracing element arranged to follow the pattern surface and to be moved along a fixed path in accordance with variations in said surface, a cutting element mounted for feeding movement relative to said work-blank, a pair of knife edges arranged in opposed relation for movement toward and away from each other and defining a narrow elongated opening between them, said knife edges being connected respectively to said elements so that the area of said opening varies with the movements of the elements, power driven means for feeding said cutting element continuously in one direction or another relative to said work-blank, means providing a source of light to which said opening is exposed, and means responsive to the amount of light passing through said opening and acting to control the direction of feed of said cutting element so as to maintain a substantially uniform spacing of said knife edges as said tracing element traverses the pattern surface.

5. In a machine for reproducing a pattern contour on a work-blank, the combination of means defining an elongated opening of narrow width arranged for the passage of light therethrough, a pattern-controlled tracing element and a cutting element each arranged to increase and decrease the area of said opening upon movements in opposite directions, power driven means for feeding the cutting element in opposite directions relative to said work-blank, a photo-electric cell responsive to the amount of the light passing through said opening, and means controlled by said photo-electric cell to regulate the operation of said feeding means so as to maintain said opening of substantially constant width during movement of said tracing element in either direction.

6. In a machine for varying the positional relation between a cutter and a work-blank in accordance with changes in the positional relation of a pattern and a tracer, the combination of means defining an opening for the passage of light therethrough, means for varying the area of said opening automatically in accordance with changes in both of said relations, reversible power-driven means for effecting continuous relative feeding movement between said cutter and work-blank in one direction or another, a photo-electric cell responsive to the light passing through said opening, and means controlled by said photo-electric cell to govern the direction of said feeding movement so as to maintain the area of said opening substantially constant.

7. In a machine for varying the positional relation between a cutter and a work-blank in accordance with changes in the positional relation of a pattern and a tracer, the combination of means defining an opening the area of which is varied automatically in accordance with changes in both of said relations, power-driven means for effecting relative feeding movements in opposite directions between said cutter and work-blank, means providing a source of light, a photo-electric cell exposed to the light passing from said source through said opening, and means controlled by said cell for determining the direction of feed by said power-driven means.

8. In a machine for varying the positional relation between a cutter and a work-blank in accordance with changes in the positional relation of a pattern and a tracer, the combination of means defining an opening for the passage of light therethrough, means for varying the area of said opening automatically in accordance with changes in both of said relations, power driven means for effecting relative feeding movements between said cutter and work-blank, and means responsive to the amount of the light passing through said opening to control said power-driven means.

9. In a machine for varying the positional relation between a cutter and a work-blank in accordance with changes in the positional relation of a pattern and a tracer, the combination of power-actuated means for effecting continuous relative feeding movement between said cutter and work-blank in one direction or another to increase or decrease the depth of a cut being made, an electrical resistance element the value of which is varied automatically in accordance with changes in both of said relations, electromagnetic means controlling said power-actuated means, and means including a thermionic device responsive to variations in the value of said resistance element and acting through the medium of said electromagnetic means and said power-actuated means to vary the positional relation between said cutter and work-blank so as to maintain said resistance at a substantially constant value.

10. The combination with a working instrumentality to be moved in different directions according to the position of a controlling element, power driven mechanism for actuating said instrumentality in different directions, a light sensitive device such as a photoelectric cell, means movable in unison with said element for varying the amount of light to which said device is exposed, and means controlled by said device and variably controlling said mechanism to cause movement of said instrumentality in one direction when the amount of the light is above a predetermined value and in another direction when the amount of light is below such value.

11. The combination with a working instrumentality to be driven, power actuating mechanism for moving said instrumentality, a light sensitive device governing the operation of said mechanism, and means operable in accordance with the movement of said instrumentality by said actuating mechanism to vary the amount of light on said light sensitive device.

12. The combination with a working instrumentality, power driven actuating mechanism for moving said instrumentality, light sensitive means governing the operation of said mechanism in accordance with the quantity of light impinging on a predetermined control area, and a controlling element varying the amount of the light to which said last mentioned means is exposed.

13. In a machine for varying the positional relation of a controlled object in accordance with changes in the position of a controlling object, the combination of power actuated means for effecting continuous movement of said controlled object in one direction or another, an electrical resistance element the value of which is varied automatically and progressively with changes in the positions of said objects, and electromagnetic means responsive to the value of said resistance and controlling said power actuated means to reverse the direction of movement of said controlled object when the resistance value rises above or falls below a predetermined range.

14. For controlling the movement of one object in accordance with the movement of a controlling object, the method which comprises directing rays of light toward a control area, varying in accordance with relative movement between said objects the quantity of the light to which said area is exposed, and varying the position of the controlled object to maintain the quantity of light over said area substantially uniform.

15. For controlling the movement of one object in accordance with the movement of a controlling object, the method which comprises directing rays of light toward a control area varying in accordance with relative movement between said objects the quantity of the light to which said area is exposed, moving the controlled object in one direction when the quantity of the light over said area is above a predetermined value and moving the controlled object in the opposite direction when the quantity of light is below said value.

16. The combination with an object to be moved in different directions according to the position of a controlling object of power driven mechanism for moving said controlled object in different directions, a light sensitive device such as a photo electric cell, means providing a source of light for directing light rays towards said device, means interposed between said light source and said device and movable in unison with said controlling object to vary the quantity of light to which said device is exposed, and means controlled by said device and governing the operation of said mechanism to cause movement of the controlled object in one direction when the quantity of the light is above a predetermined value and in another direction when the quantity of the light is below such value.

17. The combination with an object to be moved in different directions according to the position of a controlling object of power driven mechanism for moving said controlled object in different directions, a light sensitive device such as a photo electric cell, means providing a source of light for directing light rays towards said device, means movable with said controlling object to vary the quantity of light to which said device is exposed, and means controlled by said device and governing the operation of said mechanism to cause movement of the controlled object in a direction such as to oppose any variation in said quantity of light relative to a predetermined value.

EDGAR D. LILJA.